Figure 1:
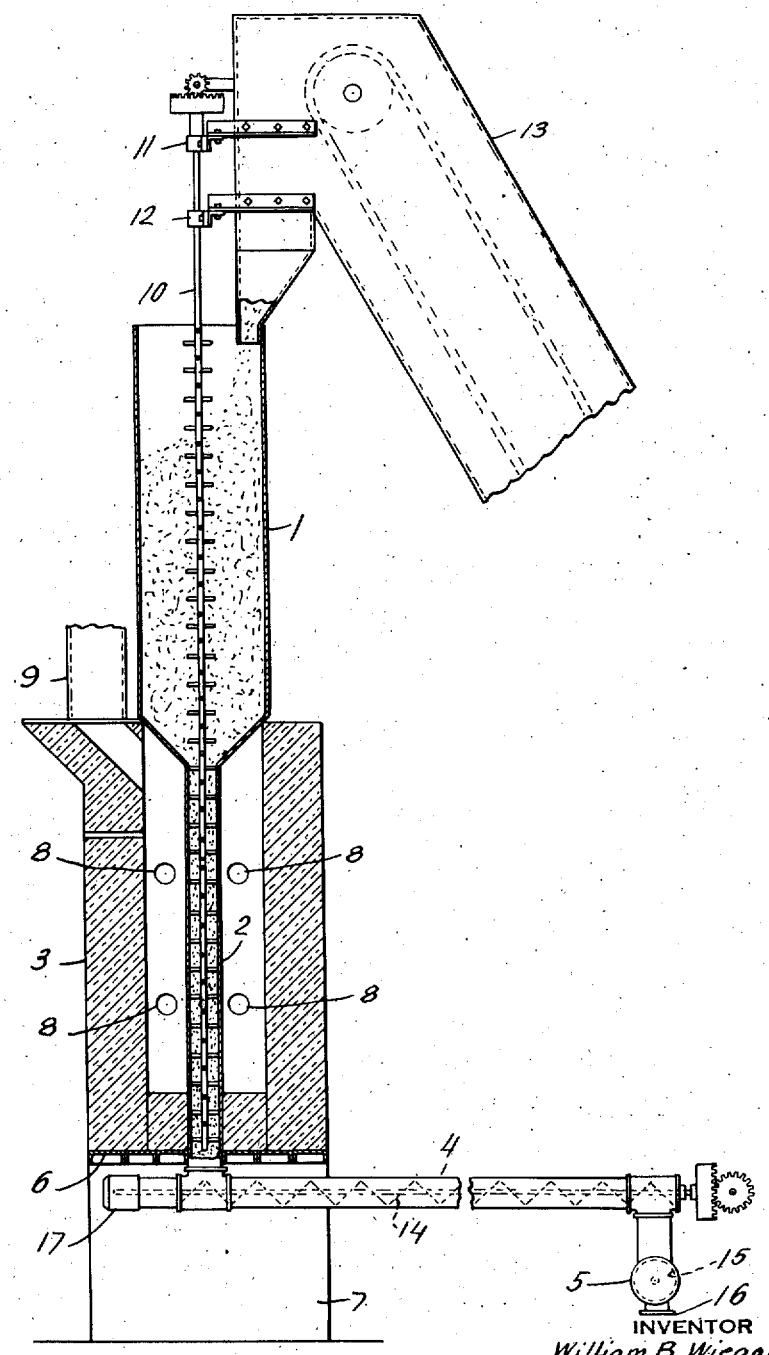

W. B. WIEGAND

June 27, 1933. MANUFACTURE OF CARBON BLACK Re. 18,884

2 Sheets-Sheet 1

Original Filed Feb. 18, 1929

INVENTOR
William B. Wiegand
BY Lennie Davis Morris & Co.
ATTORNEYS

June 27, 1933

W. B. WIEGAND

MANUFACTURE OF CARBON BLACK

Re. 18,884

2 Sheets-Sheet 2

Original Filed Feb. 18, 1929

INVENTOR
William B. Wiegand
BY
Pennie, Davis, Marvin & Edmonds
ATTORNEYS

Reissued June 27, 1933

Re. 18,884

UNITED STATES PATENT OFFICE

WILLIAM B. WIEGAND, OF SOUND BEACH, CONNECTICUT

MANUFACTURE OF CARBON BLACK

Original No. 1,807,884, dated June 2, 1931, Serial No. 340,983, filed February 18, 1929. Application for reissue filed March 17, 1933. Serial No. 661,423.

My invention relates to improvements in carbon black and in the manufacture of carbon black, and my invention includes a method of improving carbon black with respect to its properties in vulcanized rubber compounds, new carbon black of special value in vulcanized rubber and a method of making these new carbon black products.

My invention relates particularly to carbon black products produced by impingement of a hydrocarbon gas flame burning with the supply of oxygen limited to permit only partial combustion upon a cooler surface, as in the well known and widely practiced "channel process", and the term "impingement carbon black", when used herein, is intended to define carbon black products so produced and to distinguish such impingement carbon black products particularly from the softer carbon black products produced by thermal decomposition of a hydrocarbon gas.

I have discovered that the properties of impingement carbon blacks in vulcanized rubber compounds can be improved to a remarkable degree by calcining the impingement carbon black in a non-oxidizing atmosphere at temperatures upwards of 1200° F. I do not, at present, have any entirely satisfactory explanation of the result of the calcination nor do I now know exactly what changes occur during the calcination, but I do know that calcination at temperatures upwards of 1200° F. while excluding air or steam or other media causing or inducing oxidation enables me to effect an important improvement in the properties of impingement carbon blacks in vulcanized rubber compounds.

Comparing impingement carbon blacks calcined in accordance with my invention with the same carbon blacks uncalcined, in vulcanized rubber compounds, the improvements in tensile strength, in the modulus of rigidity and in the energy of resilience of the vulcanized rubber compound are particularly notable. For example, the tensile strength is frequently increased as much as 50% or more and the modulus of rigidity is frequently increased as much as 100% or more. The ageing properties of the vulcanized rubber compound also seem to be improved, as does the resistance of the vulcanized rubber compound to wear and abrasion. Furthermore, rubber compounds including the improved impingement carbon blacks of my invention vulcanize at a much higher rate than do the same compounds including the uncalcined impingement carbon black. For example, the period of cure can, in many cases, be reduced to one-half or one-third of the time required for the rubber compound including the uncalcined impingement carbon black. As compared to the usual carbon black products produced by thermal decomposition, the improved impingement carbon black products of my invention are, moreover, blacker in color.

I have just noted the improvements in vulcanized rubber compounds including impingement carbon blacks made possible by my invention. The improvement in the properties of impingement carbon blacks made possible by my invention are important in several other aspects. For example, my invention makes it possible to treat impingement carbon blacks having properties in vulcanized rubber compounds too poor to be commercially available for rubber compounding to convert these low quality carbon blacks into high quality carbon blacks having satisfactory properties in vulcanized rubber compounds. In this aspect, my invention makes available for use in rubber compounding a new source of impingement carbon blacks. In another aspect, my invention makes available for use in rubber compounding new impingement carbon black products.

I have discovered that, by calcining in a non-oxidizing atmosphere at temperatures upwards of 1200° F. impingement carbon black of good quality with respect to its properties in vulcanized rubber compounds before this calcination, I can produce a new impingement carbon black product superior with respect to its properties in vulcanized rubber compounds, so far as I am aware, to any impingement carbon block products heretofore known.

The new impingement carbon black products of my invention can be distinguished from the impingement carbon blacks heretofore known by comparison of the properties of the new carbon blacks and the known carbon blacks in vulcanized rubber compounds. In particular, in a standard rubber compound the new impingement carbon blacks of my invention will develop, on vulcanization, an unusually high tensile strength and an unusually high modulus of rigidity. For the purpose of comparison the following standard compound may be used: 930 parts (by weight) of rubber (prime ribbed smoked sheets), 350 parts of carbon black, 30 parts of zinc oxide, 50 parts of sulphur and 7.5 parts of diphenylguanidine; and this compound may be vulcanized in the usual platen press (in a sheet iron frame 0.075″ thick forming a slab 6″ square between plates of stainless steel 17″ square and ⅜″ thick) at 288° F. for 15 minutes. The prime ribbed smoke sheets mentioned should be of a quality developing a tensile strength of about 3,300 pounds per square inch when vulcanized in the usual platen press at 288° F. for forty minutes in this compound omitting carbon black. In this standard compound vulcanized under these conditions, the new impingement carbon black products of my invention will develop a tensile strength upwards of 4500 pounds per square inch, as high as 4800 pounds per square inch or higher, and a modulus of rigidity exceeding 1000, as high as 1200 or higher. Such a tensile strength exceeds by hundreds of pounds and such a modulus of rigidity is within the neighborhood of twofold the values of these properties which can be obtained using the usual impingement carbon blacks in this compound vulcanized under these conditions.

The new impingement carbon black products of my invention can also be distinguished from the impingement carbon blacks heretofore known by the physical properties of the new carbon black itself. They may, for example, be distinguished by their absorptive capacity, or rather their lack of absorptive capacity, and their volatile content. The new impingement carbon black products of my invention have a volatile content, by the Bureau of Mines coal analysis method (see Bureau of Mines Technical Paper 76 and Journal of Industrial and Engineering Chemistry, volume 9, 1917, page 102), of not more than about 4%. Likewise, the new impingement carbon black products of my invention have a characteristically low absorptive capacity with respect to organic accelerators of vulcanization such as diphenylguanidine; testing a 1 gram sample of the carbon black in 50 cc. of a solution of diphenylguanidine in ethyl alcohol containing 2 grams of diphenylguanidine per liter, the new carbon black products of my invention will remove from the solution not more than about 6% of the total diphenylguanidine present.

I have observed that the properties of impingement carbon blacks in vulcanized rubber compounds improve as the volatile content of the black and the absorptive capacity of the black decrease; that is the impingement carbon blacks of the lower volatile content and the less absorptive impingement carbon blacks seem to have better properties in vulcanized rubber compounds. In general, impingement carbon blacks having a volatile content of not more than about 7.5% and an absorptive of not more than about 11%, in terms of the tests mentioned above, have satisfactory properties in vulcanized rubber compounds.

I have noted that the new impingement carbon black products of my invention have particularly low volatile content and absorptive capacity, but in another aspect my invention provides a method of reducing the volatile content and absorptive capacity of carbon blacks generally and thus improving their properties in vulcanized rubber compounds. For example, it is possible, by means of my invention, to reduce the volatile content of an impingement carbon black from, say, 9–10% to 6–7% as well as to reduce the volatile content of an impingement carbon black from, say, 5–6% to 3–4% and to reduce the absorptive capacity of an impingement carbon black from, say, 11–12% to 8–9%, as well as to reduce the absorptive capacity of an impingement carbon black from, say, 8–10% to 5–6%, in terms of the tests mentioned above.

Continued or repeated application of the calcination treatment of my invention, however, apparently does not continue to improve impingement carbon black with respect to its properties in vulcanized rubber compounds. Up to a limited total period of treatment, the calcinization treatment of my invention continues to improve the black, but beyond this limit there seems to be no further improvement. However, the improvement effected up to this limit seems to be retained, at least in large part, even though the period of treatment be much prolonged. In other words, to secure best results the calcination must be continued for a certain minimum period of time but it is not important if the calcination is continued for a longer period of time.

Within limits, the time and temperature of the calcination seem to be somewhat interrelated, a longer period of treatment being required at lower temperature than at higher temperature. For example, in treating the usual impingement carbon blacks, marked improvement of the carbon black with respect to its properties in vulcanized rubber compounds is developed by calcination for periods of 7–10 minutes at temperatures approximating 1350–1400° F., while at 1250° F. the calcination might have to be continued for a period of as much as 20 minutes or more to effect a comparable improvement in the same carbon black. It is thus advantageous to carry out the calcination at temperatures upward of 1300° F. A period of calcination upwards of 5 minutes, at temperatures of 1200–1300° F., is usually required to develop the maximum improvement in the properties of the carbon black in vulcanized rubber compounds. The period of calcination may be regulated with respect to the improvement effected. Marked improvement of impingement carbon blacks with respect to their properties in vulcanized rubber compounds is usually effected when, by the calcination treatment of my invention, the volatile content of the carbon black has been decreased not less than 1% and the absorptive capacity of the carbon black has been decreased by a margin of not less than 2%, in terms of the tests mentioned above. The calcination treatment of my invention is, with advantage, continued until the carbon black has a volatile content less by at least 1% and an absorptive capacity less by at least 2%, in terms of the tests mentioned above, than the uncalcined carbon black.

I have just noted that continued or repeated application of the calcination treatment of my invention apparently does not continue to improve impingement carbon black with respect to its properties in vulcanized rubber compounds, and this makes it possible to distinguish the resultant improved carbon black product produced by calcination of a low quality impingement carbon black in accordance with my invention from an uncalcined impingement carbon black of satisfactory quality even though the latter may have properties in vulcanized rubber compounds comparable to those of the calcined impingement carbon black, initially of low quality but brought to satisfactory quality by calcination. In this aspect my invention provides a new impingement carbon black product having a volatile content of not more than 7.5% and an absorptive capacity of not more than 11%, in terms of the tests mentioned above, which volatile content and absorptive capacity are not substantially decreased by calcination, say, at 1300° F. for a period of 10 minutes in a non-oxidizing atmosphere.

Figure 2:
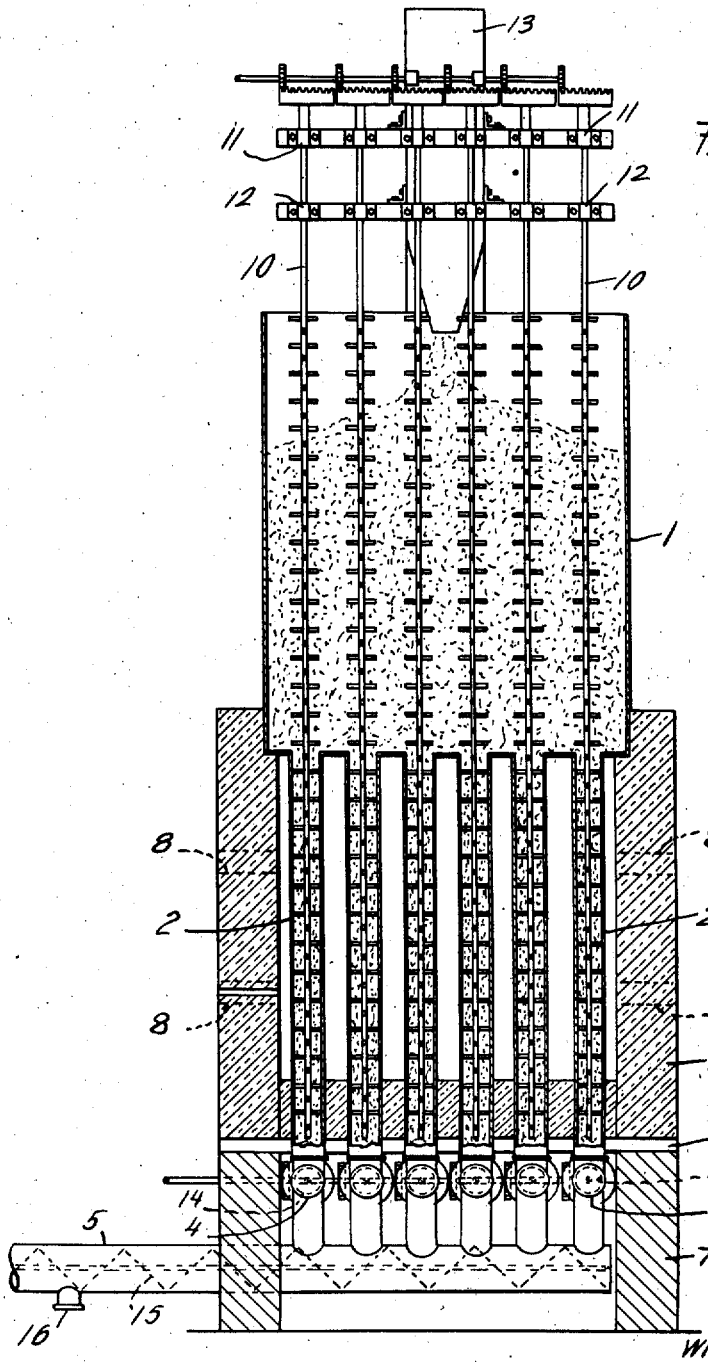

I have carried out my invention on a commercial scale in apparatus of the type illustrated, diagrammatically and conventionally, in the accompanying drawings. In these drawings, Fig. 1 is a fragmentary elevation, partly in section, of one form of apparatus adapted for carrying out my invention and Fig. 2 is another fragmentary elevation, partly in section, of the same apparatus, normal to Fig. 1.

The apparatus illustrated comprises a supply receptacle 1 connected to the upper end of a group of calcining tubes 2 extending through a furnace 3 in turn connected through a series of cooling tubes 4 to a discharge conveyor 5. The calcining furnace 3 is of brick supported upon a number of steel channels 6 in turn carried by a concrete foundation 7. At each end of the furnace 3 apertures 8 are provided for the introduction of gas burners; the two lower pairs are usually sufficient. The waste heating gases escape through stack flue 9. An agitator 10 extends through each of the calcining tubes 2 and through the supply receptacle 1 above the calcining tubes. Each of these agitators is carried by a pair of bearings 11 and 12 arranged above the supply receptacle 1. Elevator-conveyor 13 is provided for supplying raw impingement carbon black to the supply receptacle 1. Screw conveyors 14 are provided for carrying calcined carbon black through the cooling tubes 4. A screw conveyor 15 is provided for discharging the cooled calcined carbon black through the conveyor 5. Connection 16 is provided for taking samples.

I have carried out my invention on a commercial scale in apparatus of the type illustrated in which the supply receptacle 1 is 17″ wide, 55″ long and 60″ deep, exclusive of the hopper bottom, the latter being 9″ deep, in which the calcining tubes 2 comprise six tubes 4″ in inside diameter and 48″ long within the furnace, and in which the cooling tubes 4 comprise six tubes 4″ in inside diameter and about 60″ long. In such an apparatus as much as 1000 pounds per day of impingement carbon black can be subjected to calcination, in accordance with my invention, for a period of 10 minutes.

In carrying out my invention in apparatus of the type illustrated, raw impingement carbon black is dumped into the supply rereceptacle 1 by means of elevator-conveyor 13 until the tubes 2 are full of the black, until the bottom of the supply receptacle 1 is completely covered with black, and until the supply receptacle 1 is partly filled with black. The fires are then started in the furnace 3. When the furnace temperature reaches 1300–1350° F., or shortly before that time, the agitators 10 and the screw conveyors 14 are started. The agitators 10 may be driven, for example, at a speed of 8–12 revolutions per minute. The screw conveyors 14 are driven at a speed regulated to maintain the black in the calcining tubes the desired period of time. The supply receptacle 1 is maintained partially full of black throughout the operation, by means of elevator-conveyor 13. The passage of the black through the calcining tubes is relatively slow so that the black in passing through the calcining tubes, being at the same time agitated, is brought to a temperature closely approximating the furnace temperature itself. The bottom of the supply receptacle 1 being exposed to the heating gases, the black is preheated within the supply receptacle itself. As the black is heated in the calcining tubes, gases are driven off and these gases, through the action of the agitators 10, escape easily through the tubes and the charge of black maintained in the supply receptacle 1. Access of air to the black within the calcining tubes is prevented by maintaining the supply receptacle 1 partially full of black and by maintaining the cooling tubes 4, and also the dead ends 17 of these cooling tubes, full of the calcined black, as the operation proceeds. These precautions, in connection with the pressure of the gases formed within the calcining tubes, effectively maintain a non-oxidizing atmosphere within the calcining tubes. The cooled calcined black is discharged through conveyor 5 to bolters.

The cooling tubes 4, instead of being cooled by air, may be arranged within a water tank to provide more effective cooling. The cooling tubes 4, for example, may be vertically arranged as extensions of the calcining tubes 2 extending through a water tank arranged beneath the furnace.

It is intended and will be understood that the foregoing more detailed description of one method of carrying out my invention in connection with the particular apparatus illustrated in the accompanying drawings is merely for the purpose of exemplification. My invention can be practiced in other and different appartus and in apparatus of different size.

I claim:

1. A method of improving the properties of impingement carbon blacks in vulcanized rubber compounds which comprises calcining the impingement carbon black at a temperature not less than about 1200° F. in a non-oxidizing atmosphere.

2. A method of improving the properties of impingement carbon blacks in vulcanized rubber compounds which comprises calcining the impingement carbon black at a temperature not less than about 1300° F. in a non-oxidizing atmosphere.

3. A method of improving the properties of impingement carbon blacks in vulcanized rubber compounds which comprises calcining the impingement carbon black at a temperature not less than about 1200° F. for a period upwards of 5 minutes in a non-oxidizing atmosphere.

4. A method of improving the properties of impingement carbon blacks in vulcanized rubber compounds which comprises calcining the impingement carbon black at a temperature upwards of 1200° F. until the volatile content of the black is decreased not less than 1% and until a 1 gram sample of the calcined black will absorb from 50 cubic centimeters of an alcoholic solution of diphenylguanidine containing 2 grams per liter a percentage of the total diphenylguanidine present less by a margin of not less than 2% than a 1 gram sample of the uncalcined black.

5. An impingement carbon black product having a volatile content of not more than 4% and of which a 1 gram sample will absorb from 50 cubic centimeters of an alcoholic solution of diphenylguanidine containing 2 grams per liter not more than 6% of the total diphenylguanidine present.

6. An impingement carbon black product which, in a rubber compound consisting of 930 parts of rubber (prime smoked sheets), 350 parts of the carbon black, 30 parts of zinc oxide, 50 parts of sulphur and 7.5 parts of diphenylguanidine vulcanized at 288° F. for 15 minutes, will develop a tensile strength exceeding 4500 pounds per square inch and a modulus of rigidity exceeding 1000.

7. An impingement carbon black product having a volatile content of not more than 7.5% and of which a 1 gram sample will absorb from 50 cubic centimeters of an alcoholic solution of diphenylguanidine containing 2 grams per liter not more than 11% of the total diphenylguanidine present and of which the volatile content and the absorptive capacity for diphenylguanidine, measured by this test, are not substantially decreased by calcination at 1300° F. for a period of 10 minutes in a non-oxidizing atmosphere.

8. An impingement carbon black product produced by calcining impingement carbon black at a temperature not less than about 1200° F. in a non-oxidizing atmosphere.

9. An impingement carbon black product produced by calcining impingement carbon black at a temperature not less than about 1300° F. in a non-oxidizing atmosphere.

10. An impingement carbon black product produced by calcining impingement carbon black at a temperature not less than about 1200° F. for a period not less than about five minutes in a non-oxidizing atmosphere.

11. A rubber product comprising a vulcanized compound having contained rubber, a vulcanizing agent, and a deactivated impingement carbon black.

12. A rubber product comprising a vulcanized compound having contained rubber, a vulcanizing agent, a vulcanization accelerator and a deactivated impingement carbon black.

13. A rubber product comprising a vulcanized compound having contained rubber, a vulcanizing agent, an organic vulcanization accelerator and a deactivated impingement carbon black.

In testimony whereof I affix my signature.

WILLIAM B. WIEGAND.